(12) United States Patent
Rizzo

(10) Patent No.: US 9,775,469 B2
(45) Date of Patent: Oct. 3, 2017

(54) KIT FOR TAKE AWAY PIZZA

(71) Applicant: Armando Rizzo, Saronno (IT)

(72) Inventor: Armando Rizzo, Saronno (IT)

(*) Notice: Subject to any disclaimer, the term of this patent is extended or adjusted under 35 U.S.C. 154(b) by 0 days.

(21) Appl. No.: 15/100,306

(22) PCT Filed: Dec. 9, 2014

(86) PCT No.: PCT/IB2014/002701
§ 371 (c)(1),
(2) Date: May 28, 2016

(87) PCT Pub. No.: WO2015/087135
PCT Pub. Date: Jun. 18, 2015

(65) Prior Publication Data
US 2017/0020344 A1  Jan. 26, 2017

(30) Foreign Application Priority Data

Dec. 10, 2013 (IT) .............................. VA2013A0063
Jan. 10, 2014 (IT) .............................. VA2014A0001
Feb. 25, 2014 (IT) .............................. VA2014A0006

(51) Int. Cl.
*A47J 47/14* (2006.01)
*B65D 21/04* (2006.01)
(Continued)

(52) U.S. Cl.
CPC .............. *A47J 47/145* (2013.01); *B65D 1/34* (2013.01); *B65D 5/001* (2013.01); *B65D 5/20* (2013.01); *B65D 5/4233* (2013.01); *B65D 5/4245* (2013.01); *B65D 5/62* (2013.01); *B65D 5/66* (2013.01); *B65D 21/046* (2013.01); *B65D 81/263* (2013.01); *B65D 85/36* (2013.01); *B65D 2231/005* (2013.01); *B65D 2585/366* (2013.01)

(58) Field of Classification Search
CPC . B65D 1/34; B65D 5/00; B65D 5/001; B65D 5/20; B65D 5/42; B65D 5/4233; B65D 5/4245; B65D 5/62; B65D 5/66; B65D 21/04; B65D 21/046; B65D 81/26; B65D 81/263; B65D 85/36; B65D 85/62; B65D 2231/005; B65D 2585/366
USPC .................................................. 206/518, 551
See application file for complete search history.

(56) References Cited

U.S. PATENT DOCUMENTS 3,016,644 A * 1/1962 Sass ..................... B65D 5/4233
40/312
3,379,340 A * 4/1968 Silvio ................ B65D 21/0209
206/509

(Continued)

FOREIGN PATENT DOCUMENTS

WO  WO 9319989 A1 * 10/1993 ........... B65D 5/3678
WO  9924331  5/1999

*Primary Examiner* — Bryon Gehman
(74) *Attorney, Agent, or Firm* — Themis Law

(57) ABSTRACT

A kit for take-out pizza includes a container and a cover, wherein the pizza container includes a basin-shaped tray having slanted lateral sides that enable stacking a second tray on the first tray by having the slanted walls support a bottom of the second tray received into the slanted walls, and stop projections provided on lower inner portions of the lateral walls of the tray, which support the second tray to form a stack of trays and to define, within the lower tray, a chamber for housing a pizza to be transported.

15 Claims, 9 Drawing Sheets

(51) Int. Cl.
    *B65D 1/34*     (2006.01)
    *B65D 81/26*     (2006.01)
    *B65D 5/42*     (2006.01)
    *B65D 5/62*     (2006.01)
    *B65D 5/00*     (2006.01)
    *B65D 5/20*     (2006.01)
    *B65D 5/66*     (2006.01)
    *B65D 85/36*     (2006.01)

(56) References Cited

U.S. PATENT DOCUMENTS

| | | | | |
|---|---|---|---|---|
| 4,373,636 A * | 2/1983 | Hoffman | B65D 1/34 | 206/551 |
| 4,813,543 A * | 3/1989 | Goldberg | B65D 21/046 | 206/507 |
| 5,076,434 A * | 12/1991 | Hoffman, Jr. | B65D 85/36 | 206/518 |
| 5,565,228 A * | 10/1996 | Gics | B65D 81/3453 | 206/564 |
| 6,257,434 B1 * | 7/2001 | Lizzio | B65D 85/36 | 206/551 |
| 6,601,758 B2 * | 8/2003 | Lizzio | B65D 81/263 | 229/120 |
| 2003/0213718 A1 * | 11/2003 | Ducharme | A47J 47/14 | 206/503 |
| 2006/0022026 A1 | 2/2006 | Yandian | | |
| 2006/0131369 A1 | 6/2006 | Oddo | | |

\* cited by examiner

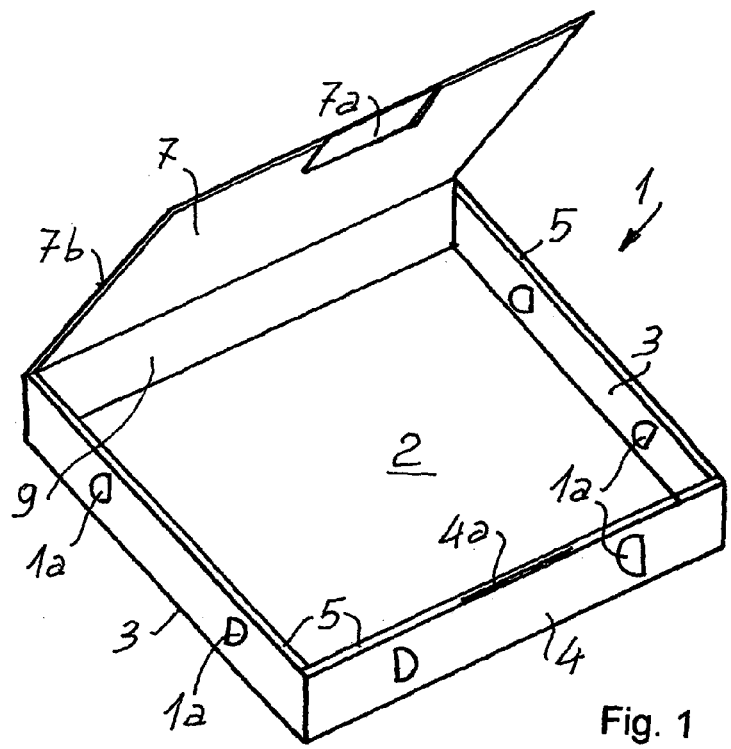
Fig. 1
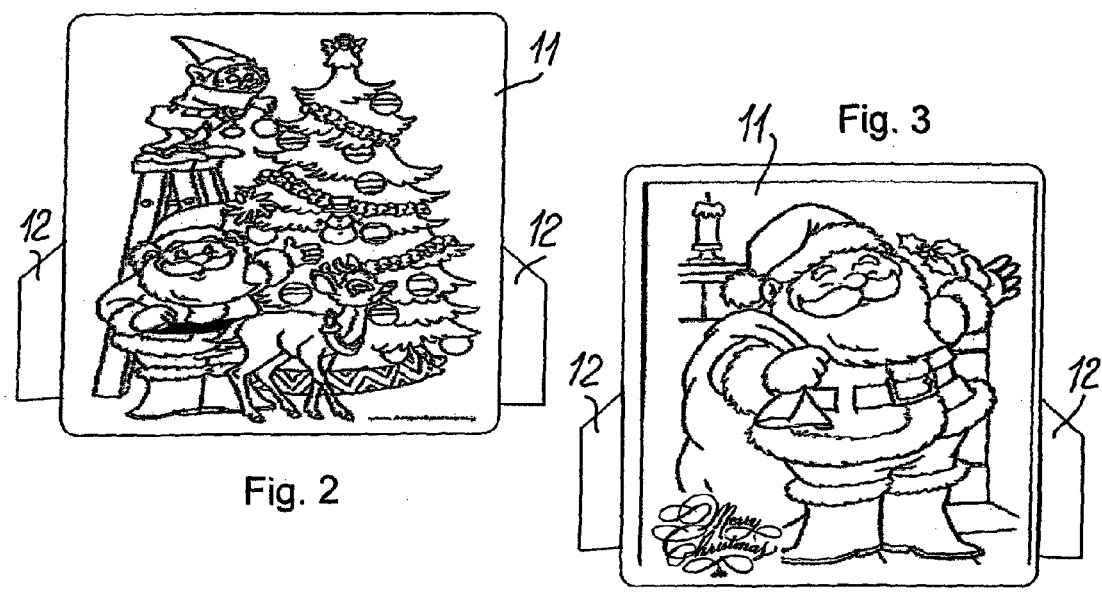
Fig. 2
Fig. 3

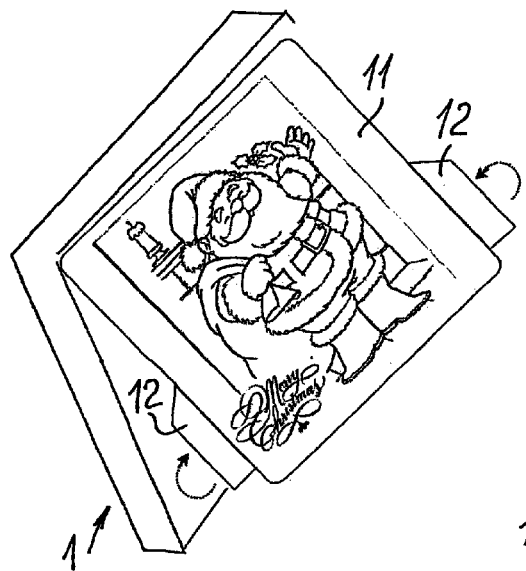
Fig. 4
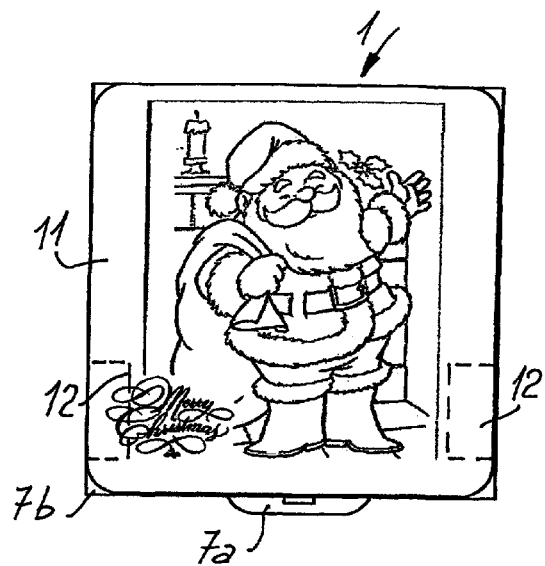
Fig. 5
Fig. 6
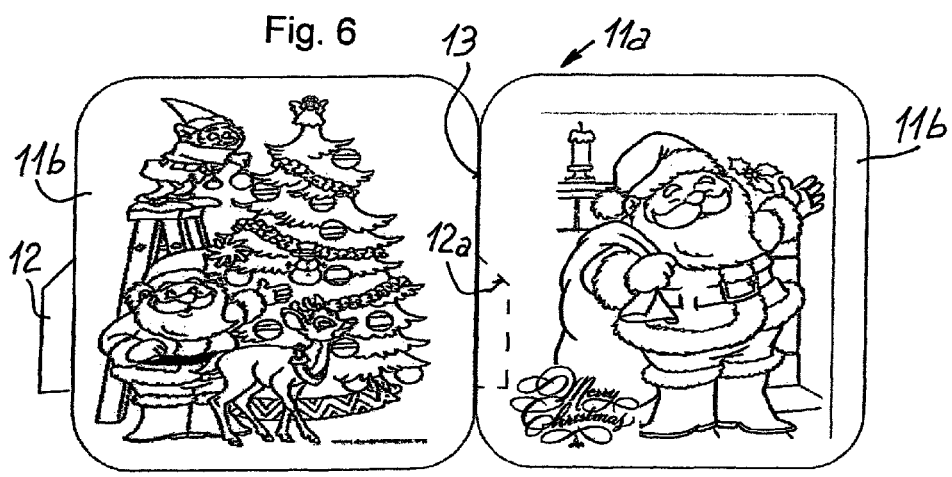

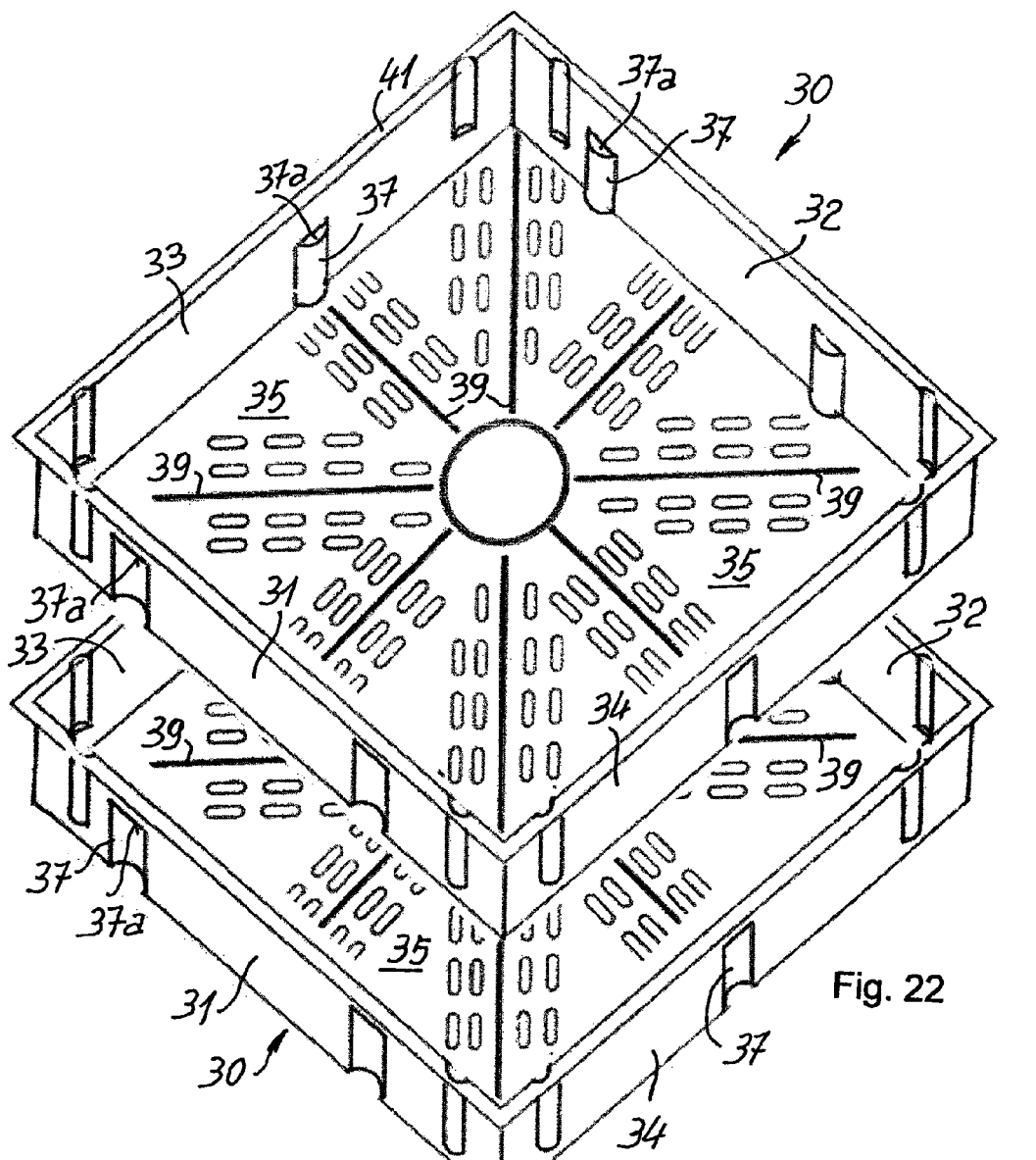
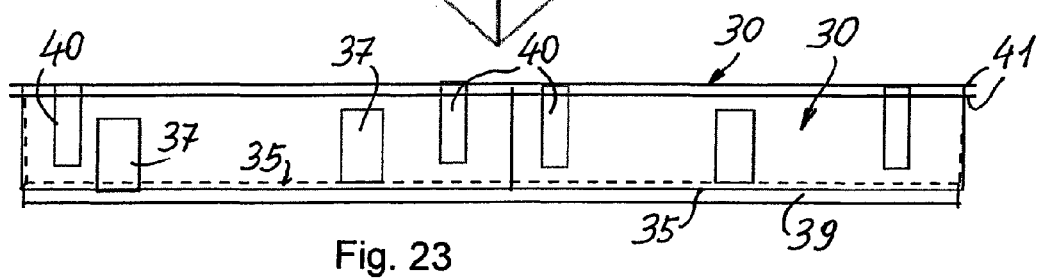
Fig. 22
Fig. 23

KIT FOR TAKE AWAY PIZZA

FIELD OF THE INVENTION

The present invention refers to a kit for take away pizza according to the preamble of claim 1.

TECHNOLOGICAL BACKGROUND AND STATE OF THE ART

As known, for the transport of take away pizza there are usually used box-shaped containers made of carton or corrugated carton, which are obtained from an initial cut element folded so as to define a box-shaped part having a bottom for supporting the pizza and lateral walls with height such to allow the housing of a pizza and which are connected to each other by various perimeter engagement points formed singularly by a respective fin which can be engaged in a corresponding circular opening previously obtained in the cut element, as well as part of the oscillable lid with the edge opposite the oscillable side having a tab which can be folded and inserted into a hole in the box-shaped part.

Normally, on the lid there are general prints, usually reproducing the name, logo or image with advertisement text referring to the single pizza makers or advertisement texts and illustrations regarding nearby products or shops, wherein there is known the difficulty of obtaining personalisation of the boxes for small amounts of boxes, due to the high amortisation costs of the manufacturers.

On the one hand, the known boxes satisfactorily meet their known task of easy and inexpensive obtainment. However, on the other hand they reveal various drawbacks and disadvantages. Actually, during the transport from the pizza production point to the client in the box there is created a condensate produced by the vapour generated by the pizza, inserted from the oven into the box, and which progressively cools thus jeopardising the organoleptic characteristics of the pizza. In addition, these box-shaped containers are easily permeable to fats and oil dispersed in the pizza in the box in the movements thereof and which can also seep from the pizza itself. Should this dirt with fats and oil of more or less extensive surface parts of the box the boxes shall be disposed in waste sites without the possibility of being recycled.

A further disadvantage of the known pizza boxes consists in the fact that in order to eat the pizza whether one opens and the lid is turned over and placed on the table directly cutting the pizza which remains on the bottom of the box, or if one wants to place the pizza on a plate it will be required to hold the pizza with the fingers and place it on a plate and this operation inevitably implies dirtying the hands with the oil and fat on the pizza.

Regarding the known pizza cartons it should be observed that at times when assembling these boxes may be subjects to small but unpleasant and painful cuts on the fingers. In addition, it should be observed that the assembly of these boxed requires a given period of time and they require considerable storage space. In addition, the known habit of cutting and eating the pizza directly on the bottom of the box is per se quite unadvisable given that it is not perfectly hygienic.

Lastly, it should be observed that the aforementioned condensate, caused by the vapour generated by the heat released by the pizza, may not be necessarily eliminated during the transport, hence when eating the pizza it is not always as crunchy as it is when taken from the oven.

As pizza containers, there are also known trays made of synthetic material of the box-shaped type without lid, which, when superimposed for transporting several pizzas they only rest on two sides, thus partly jeopardising stability in case of stacks of trays. Even with these known trays the superimposition thereof tends to maintain—in the same—the vapour and condensate that is formed, hence leading to the aforementioned drawbacks with reference to pizza boxes.

The document U.S. Pat. No. 3,016,644 discloses a foldable advertisement cover for milk containers at the top part to shape a roof, which covers only one part of the upper surface of the container and with the upper end thereof it projects oblique upwards from the container for a considerable part.

The document WO 93/19989 A1 substantially illustrates a pizza container formed by two corrugated carton elements which can be superimposed and having fin parts and openings for the connection of these two cut elements, wherein there are also illustrated parts of the bottom lifted to have air circulation beneath the pizza. This also allows eliminating corrugated carton inserts hence saving.

The document U.S. Pat. No. 5,219,116 discloses a decorating ribbon which may be easily connected to cake boxes, the boxes having a lid which can oscillate with lateral fins which extend for the height of the box and cover the two lateral walls of the box. The decorating ribbon covers a strip of the lid and has lateral fins also extending for the height of the lateral walls of the box and have—at the lower part—fins adapted to fix the decorating ribbon to the box, which must also have fixing pins cooperating with those of the decorating ribbon.

The document US 2005/011939 discloses an improved box for take away pizza with resilient corners which tend to push the tab and a hole of the box in a fixing relationship to prevent a opening of the corners and exit of the pizza.

The document EP 1 193 184 A2 discloses a box for take away pizza comprising a box-shaped container and a plate, having a base wall with ribs projecting upwards and downwards.

The document US 2006/131369 A1 illustrates a box for take away pizza with an oscillable lid laterally having two holes for the passage of corresponding handles of an internal tray for holding he pizza, the projecting handles preventing the stacking of a plurality of similar boxes.

The document US 2006/0022026 A1 illustrates an insert for holding several food products during cooking e during the transfer thereof in a box-shaped container, wherein said insert has lateral foldings serving as grasping or handle elements.

The document EP 0 989 067 A1 discloses a container for transporting take away pizzas formed by two opposite plastic shells each having a bottom wall and a lateral wall with ribs defining, in the closed position, a chamber for housing the pizza, and in communication with the external through valve openings.

The document DE 94 01 839 U1 illustrates a packaging for pizzas with lid and lower part connected in a hinge-like fashion, in which the total surface of the is compressed funnelled circular or polygonal-shaped in the lid and in the lower part, which are removably connected by an oval-shaped fin of the lid whose lateral parts can be inserted into a seat for opposite in the lower part.

The document U.S. Pat. No. 3,403,814 discloses a pizza tray in a square single piece, that can be stacked.

The document U.S. Pat. No. 3,005,572 discloses a plastic drawer structure for the transport and presentation of various types of products, the drawer being suitable for stacking.

The document U.S. Pat. No. 4,058,214 discloses a stackable drawer-like container, with tapered strips and ribs for interlocking the stacking.

SUMMARY OF THE INVENTION

The present invention has the task of providing a take away pizza kit for pizzerias allowing, on the one hand, eliminating the drawbacks and disadvantages regarding pizza containers of the known art and, on the other hand, considerably increasing the surface that can be used as an efficient advertisement medium, to facilitate the removal and transfer of the pizza from the container, box or tray, on the plate also allowing easy cutting of the pizza into slices, substantially maintaining the typical organoleptic characteristics, of fragrance and crunchiness of the pizza, as well as allowing the reutilisation of the trays and recycling the carton boxes according to incentives by the municipalities.

It should be observed that in 2013 pizza consumers in Italy disposed around 50,000 tonnes of greasy recyclable and non-recyclated boxes.

The indicate task is met, according to the invention, through a kit for take away pizza having the characteristics of claim 1.

Further advantageous developments and embodiments are indicated in the respective dependent claims.

The kit for take away pizza according to the invention allows obtaining numerous advantages.

Firstly, the pizza maker has the possibility of selecting, from time to time, the container deemed most convenient as regards customer orders taken into account from time to time, with the possibility of simultaneously providing a high amount of various and advertisement information having at disposal at least two surfaces of the cover, that is the outer side and inner side thereof, easily and entirely readable. The proposed covers, both simple and multiple, are easy and quick to apply (either directly on the lid of the boxes by means of simple means or simply inserted in the opening of the trays) and reach a large number of readers. It was observed that with 350 covers there can be reached about 1,000 readers, while obtaining the same number of about 1,000 readers would require more than 20,000 flyers. The covers of the proposed kit are thus also eco-friendly, in that they entail lesser flyers in the post offices boxes, cleaner roads, less waste of paper, lesser deforestation. In the case of a stack of boxes or trays, the cover will only be applied to the upper box/tray, and not on all boxes or trays, hence saving considerably. The pizza boxes according to the invention may also be provided with an internal pizza plate provided with projections for supporting or holding the pizza which allow maintaining the pizza spaced with respect to the bottom of the box, thus allowing an optimal circulation of air in the closed box and thus guaranteeing minimum humidity/condensate in the box, thus the pizza maintains its organoleptic and fragrance characteristics even after the time of transport.

A further advantage of the pizza plate lies in the fact that upon reaching destination, when consuming the pizza the user may easily remove the pizza from the box thus holding the removal fin provided for on the pizza plate thus sliding said pizza plate from the bottom of the box into the plate of the client, or lifting it from the lid-less tray container by grasping the gripping fins arranged at the corners of the pizza plate.

This innovative teaching allows an easier and safe grasping and the ripping fins remain at a substantially lower temperature with respect to the areas covered by the pizza, thus avoiding burning the fingers.

The tray container made of recyclable synthetic material for handling food products according to the invention represents an advantageous alternative to the ready carton boxes, hence considerably saving time and space with the possibility of cutting and eating the pizza under hygienic conditions using the tray containing the pizza, or using the sheet-shaped pizza plate of the proposed kit, like in the case of carton boxes. According to the invention, it is also possible to eliminate the vapour/condensate which would otherwise be present and thus avoiding the retention of vapour in the container, hence allowing controlling the condensate and using a truly recyclable product. The proposed trays are slightly sunken on the perimeter, as known, so as to allow an easy stacking and, according to the invention, after rotating by 90 degrees an upper tray with respect to the lower tray, allows spaced engagement between two superimposed trays, with new solutions similar to "chimneys" allowing an easy release of the vapour and a considerable stability of a stack of superimposed trays.

The presence of continuous radial grooves on the bottom of the pizza plates and trays contributes to stiffening the same, while the plurality of protrusions allows the aforementioned circulation of air under the pizza in the box or tray, thus maintaining the pizza fragrant and crunchy.

BRIEF DESCRIPTION OF THE DRAWINGS

Further characteristics, advantages and details of the kit for take away pizza according to the invention shall be more apparent from the following description of embodiments schematically illustrated in the attached drawings, showing in different scales for greater clarity:

FIG. 1 is a top front perspective view of a take away pizza container according to the prior art, with the lid open;

FIG. 2 is a top view on a side of a simple cover according to the invention;

FIG. 3 is a top view on the other side of the simple cover of FIG. 2;

FIG. 4 is a perspective view of a pizza container of the known type with simple cover arranged on the lid, before fixing the cover;

FIG. 5 is a top view on the box of FIG. 4, with lid closed and simple cover fixed thereto;

FIG. 6 is a top view on a side of a double cover, which can be folded, according to the invention;

FIG. 22 shows an oblique top perspective view on two pizza trays superimposed and spaced in stacking position, before the stacking thereof;

FIG. 23 is a front view on the two trays of FIG. 22 in the stacked position thereof;

DESCRIPTION OF THE PREFERRED EMBODIMENTS

Figure 7:
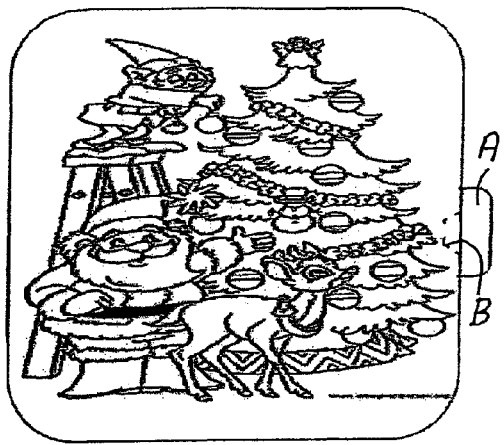
FIGS. 7 and 8 are respectively a view on a side and on the other side a simple cover of different embodiment, corresponding to FIGS. 2 and 3.
Figure 8:
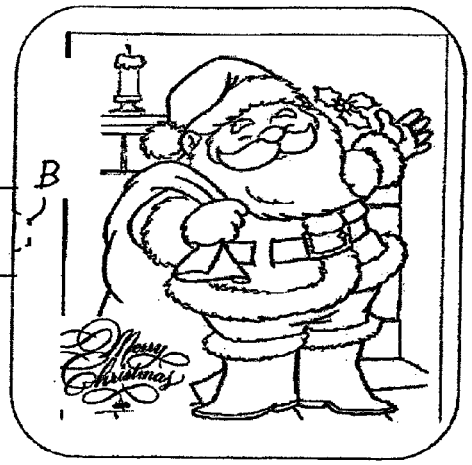

A conventional box 1 for take away pizza is schematically illustrated in FIG. 1 and it has two opposite lateral walls 3 and a front wall 4, which have—at the upper part—an edge 5 folded horizontally for supporting an oscillable lid 7 connected, through a folding line 8, with the further front wall 9, wherein coupling means, not illustrated, guarantee maintaining the box shape of the lower part 2 of the box, wherein said boxes are obtained by folding a carton or corrugated carton cut element, on which the folding lines are pre-cut. On the upper side of the lid 7 there are generally borne writings and illustrations regarding the pizza world, for example the name of the pizzeria, and this in case of medium-high production.

The drawbacks of such pizza boxes of the prior art are addressed in the introduction.

According to the present invention below is a proposal to pizzerias and municipalities for a kit for take away pizza to be used for the solution of the indicated task and obtaining the aforementioned advantages, selecting the components of the kit deemed most convenient from time to time as a function, for example, of the type of stuffing of the required pizzas, of the number of the ordered pizzas, of the pizza delivery time and so on and so forth, thus always obtaining the maximum information communication efficiency, keeping the containers hygienically clean, with the recycling possibility thereof, as well as maintaining the flavour and crunchy characteristics of the pizzas even after being kept in the container over the transport or delivery period.

According to a first teaching of the present invention a considerable increase of the surface intended for the advertisement communication can be obtained by utilising a sheet-like cover or lid cover 11 as indicated in FIG. 3 and having a surface substantially equivalent to the surface of the lid of the pizza container 1, without projecting parts. With the aim of simple and quick fixing of the cover 11 to the lid 7, on two opposite edges of the cover 11 there is provided for respectively at least one foldable fin 12 which, after placing the cover 11 on the lid 12 they are folded around the underlying sides of the lid hence, closing the lid, said fins remain trapped between the lower side of the lid and the perimeter edge 5 of the lateral walls 3.

Such solution could considerably increase the space intended for the messages and commercial illustrations providing for a multiple cover 11, in the example in FIG. 6 a double cover, with fins 12, 12a provided for in the initial cut element comprising a folding line 13 for a correct superimposition of the two covers 11. While a fin 12 is obtained as illustrated above, the fin 12a is cut on the side of the cover 11a hence, after folding the two cover faces along the line 13 the two fins 12 e 12a project from the folded cover analogously as illustrated in FIGS. 2 and 3. This not only allows increasing the surface to be dedicated to advertisement, but also a part of said covers could constitute a promotion coupon, or the like, which can be detached in a pre-cut fashion from the covers, this obviously not being possible with the carton of the box 1 itself.

FIG. 5 shows that, after applying the cover as indicated above, it is firmly anchored to the lid 7 on the two sides thereof without projecting parts.

Figure 9:
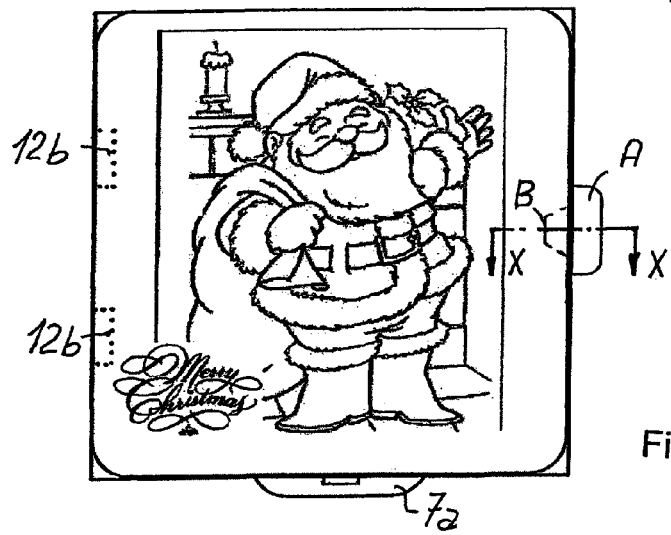
FIG. 9 is a top view on a box as in FIG. 5 with a simple cover in the embodiment according to FIGS. 7 and 8.
Figure 10:
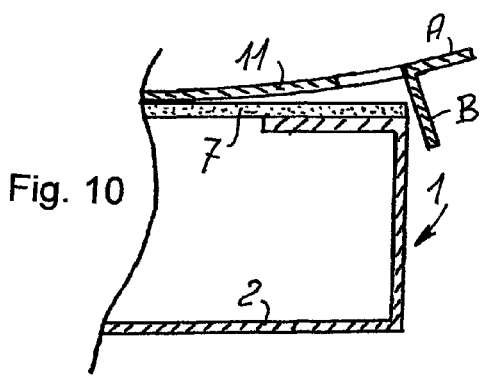
FIG. 10 is a detail in enlarged section according to the line of section X-X in FIG. 9 before folding the fixing fin of the cover around the lid of the box.
Figure 11:
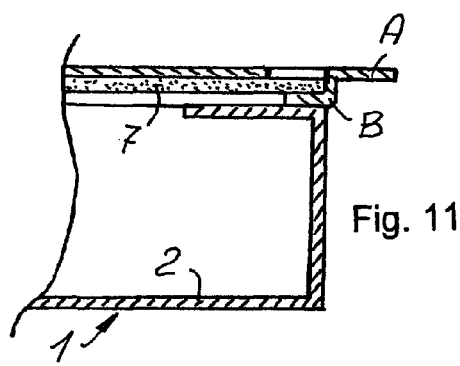
FIG. 11 shows the detail as in FIG. 10 after folding the fixing fin around the lid and the closure of the lid on the box.
Figure 12:
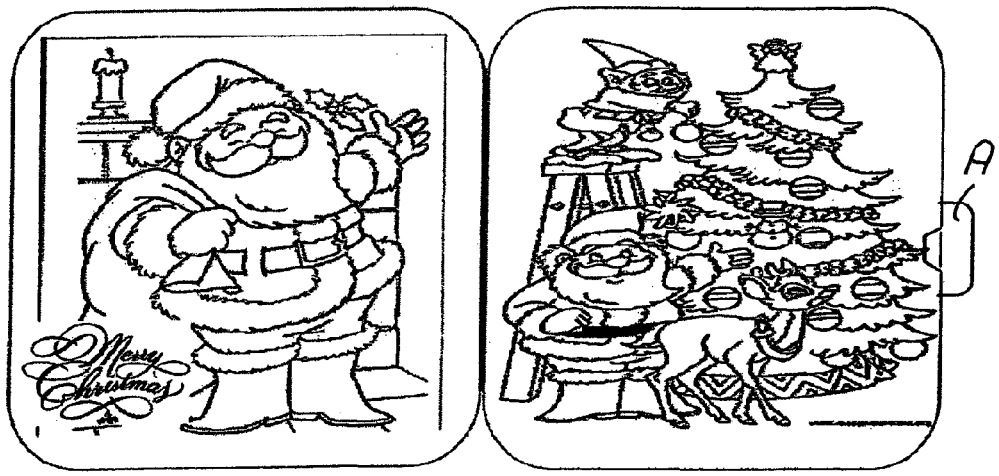
FIG. 12 is a top view on an open printed cut element of a double cover.
Figure 13:
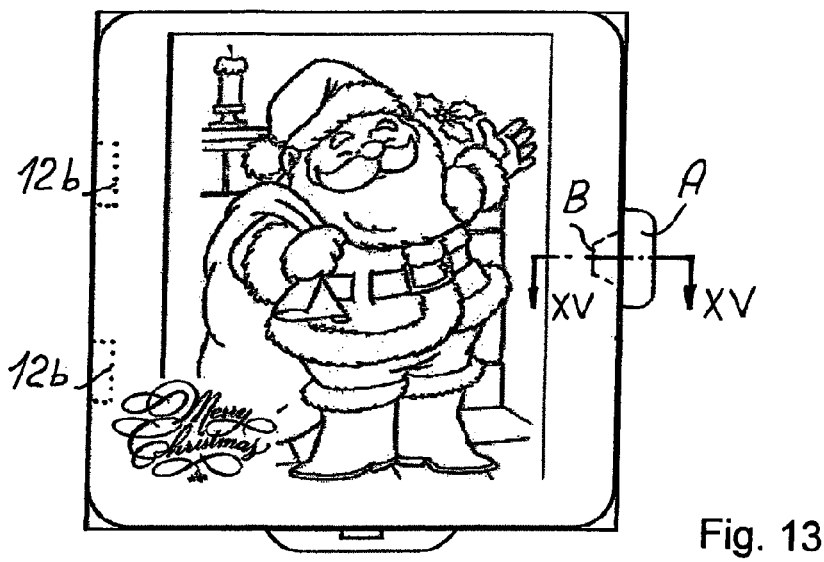
FIG. 13 is a top view on a box as in FIG. 9 with a double cover in the embodiment according to FIG. 12 folded.
Figure 14:
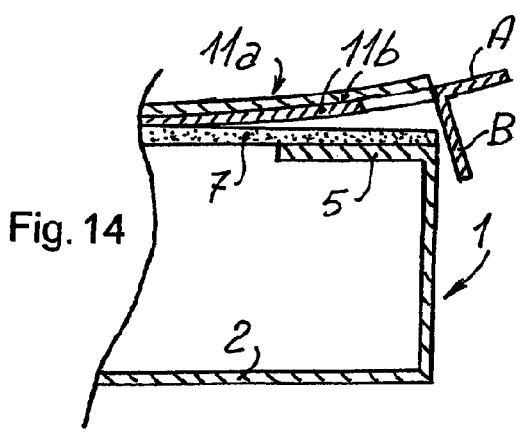
FIGS. 14 and 15 are respectively an enlarged detail according to the section line XV-XV in FIG. 13 similarly to FIGS. 10 and 11.
Figure 15:
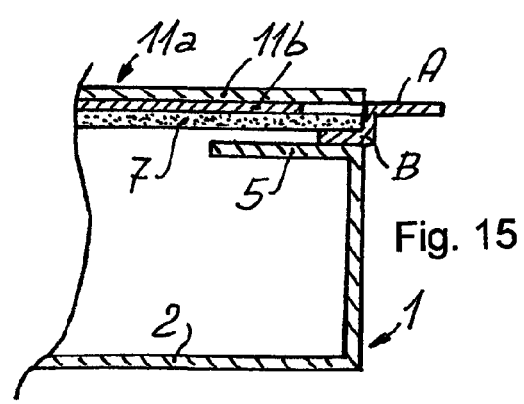
Figure 16:
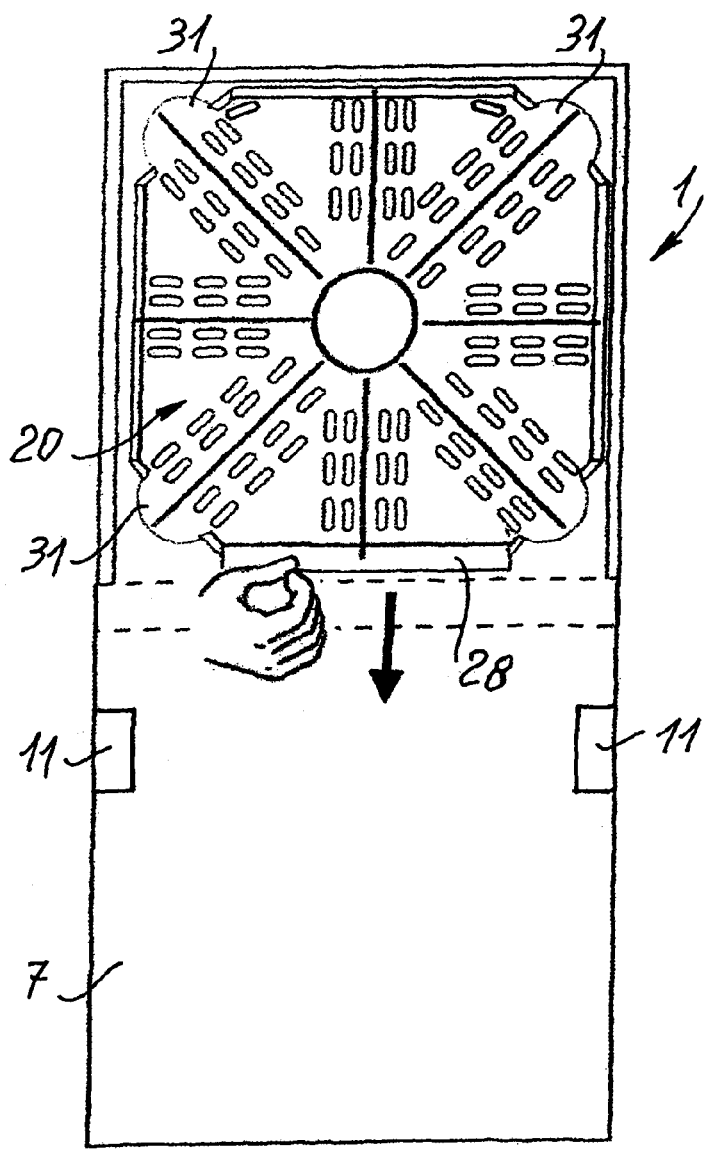
FIG. 16 is a box with lid open seen from within the box with a simple cover of the type indicated in FIGS. 2 and 3, and additionally with a pizza plate with a pizza indicated with dashed line in a removal position.

The fixing of the simple or folded cover 12 to the lid of the box may also obviously occur through any other suitable means or method, for example, on one side of the box lid, with two spaced metal pins which can be applied using a known manual sewing machine, clips or small pieces of adhesive tape, as indicated with dotted lines in FIG. 9.

The simple covers 11 and the multiple ones with more sheets can always be printed on the front and rear surfaces thereof and they can be easily removed from the respective carton or tray containers.

In the kit according to the invention there is also included, as container, a conventional pizza box as illustrated in FIG. 1, which, in order to avoid dirtying the same with oil or fat of the pizza is provided with an associated pizza plate 20, FIGS. 8-13. The pizza plate 20 is provided for the insertion in the pizza container placed on the bottom thereof, hence it will have dimensions that allow easy introduction thereof in the box and a perimeter substantially corresponding to the inner perimeter of the box.

Alternatively to the insertion into a pizza container, the pizza plate 20 according to the invention may also be arranged on the bottom of a pizza container 30, as illustrated more in detail hereinafter.

As observable from the figures, the pizza plate 20 has a substantially sheet-like conformation with perimeter edges 21 on the three sides and a plurality of projections or protrusions 22 distributed to groups in substantially triangular sectors 23 separated by grooves 24 facilitating the cutting of the pizza into sectors equally substantially triangular 23. Upon placing a pizza on the protrusions 22, between said protrusions 22 and the groups of said protrusions there are hollow areas and channels between which there occurs a free circulation of air between the lower side 26 of the pizza P and the underlying pizza plate.

With the aim of easily removing the pizza plate using the hands both from the pizza boxes or trays, on the free edge of the pizza plate 20 there is provided a strip or fin 28 for grasping using fingers for the removal of the pizza plate with pizza form the box with an easy removal/sliding movement.

With 29 there is for example indicated two protrusions for stopping the pizza, which have a greater height with respect to that of the protrusions 22 and prevent the pizza-lateral wall contact of the box. Other protrusions 29 may be provided in as many as one wishes and arranged at will to avoid a contact between the pizza and the perimeter walls of the box, or tray, and avoid the sliding of the pizza during the removal of the grasping strip 28 from the box.

Figure 19:
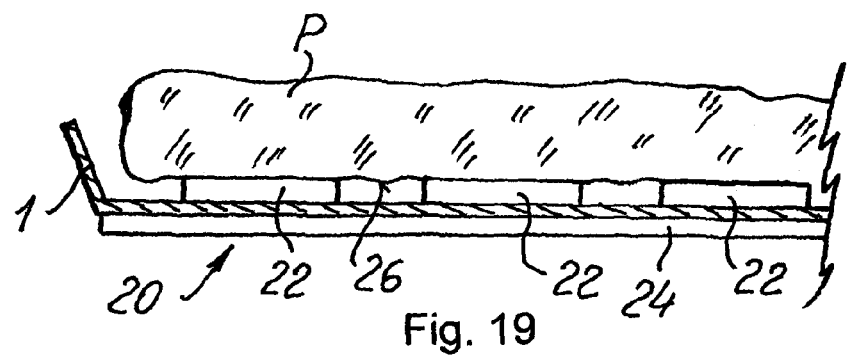
FIG. 19 shows, in enlarged scale, the detail in section according to line XIX-XIX in FIG. 17.
Figure 17:
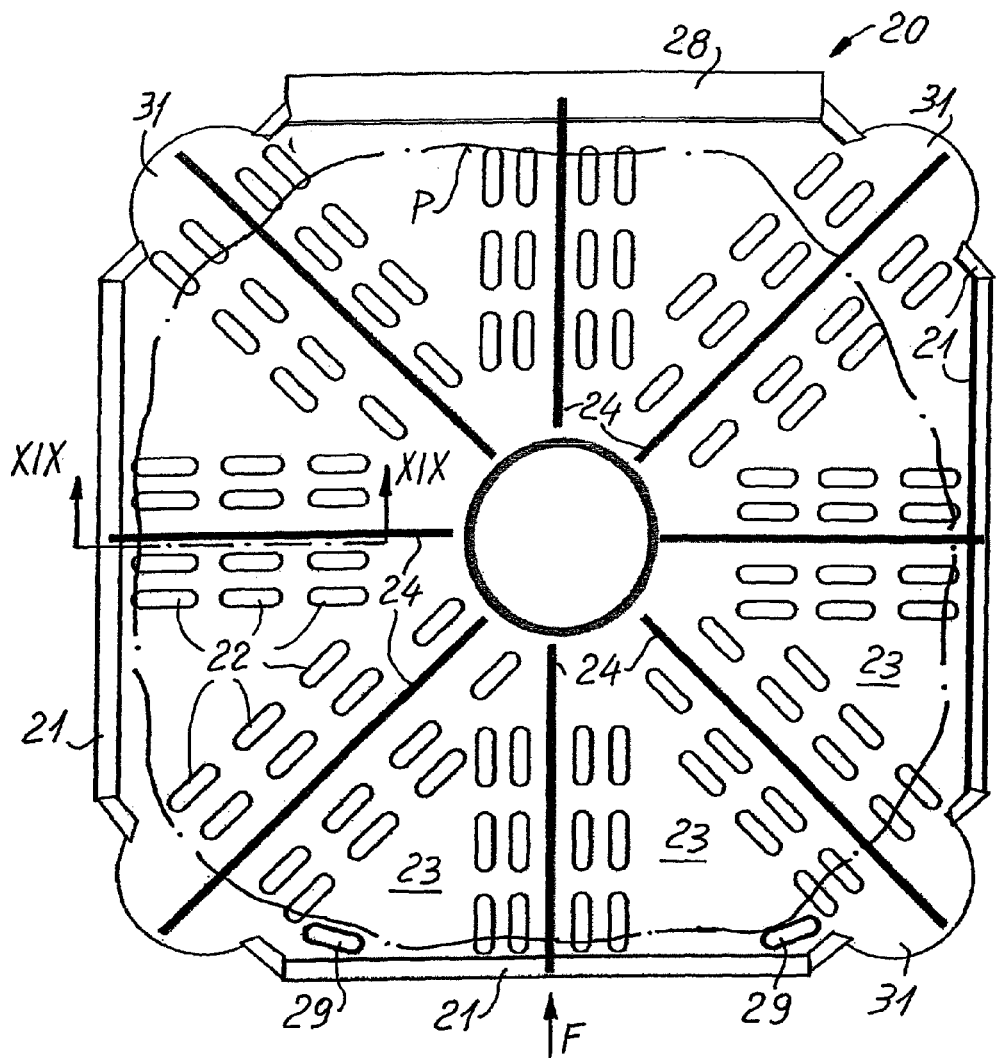
FIG. 17 is a top view on the pizza plate of FIG. 16.
Figure 18:
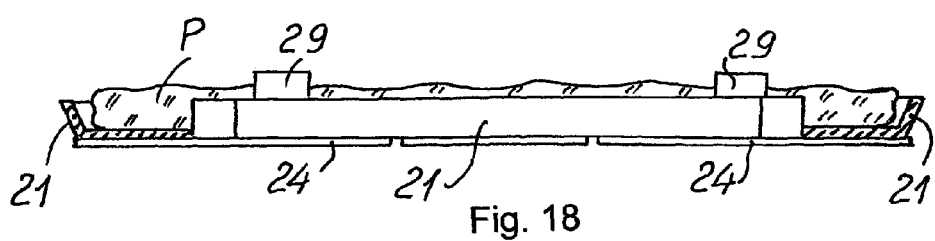
FIG. 18 is a front view of the pizza plate according to arrow F.

At the corners of the pizza plate 20 there is also respectively provided a grasping fin 31, substantially semi-circular shaped in the example. These fins 31 can be grasped with fingers to remove the pizza plate, with the pizza thereon, from a tray-like container. FIGS. 17-19 show the position of the pizza P on the projections of a pizza plate.

Figure 20:
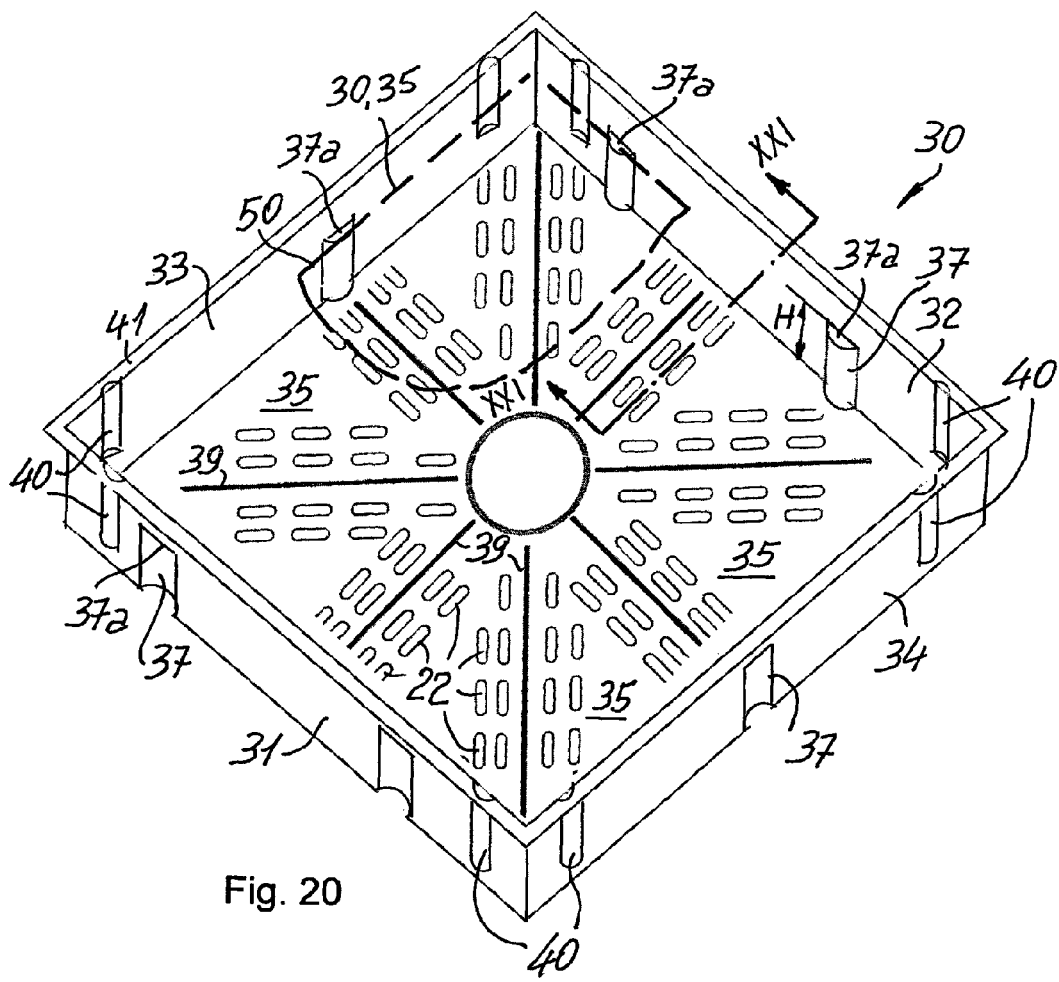
FIG. 20 is a top oblique perspective view on a pizza tray according to the invention which can be stacked and superimposed for the housing one or more pizzas simultaneously and independently with respect to each other.
Figure 21:
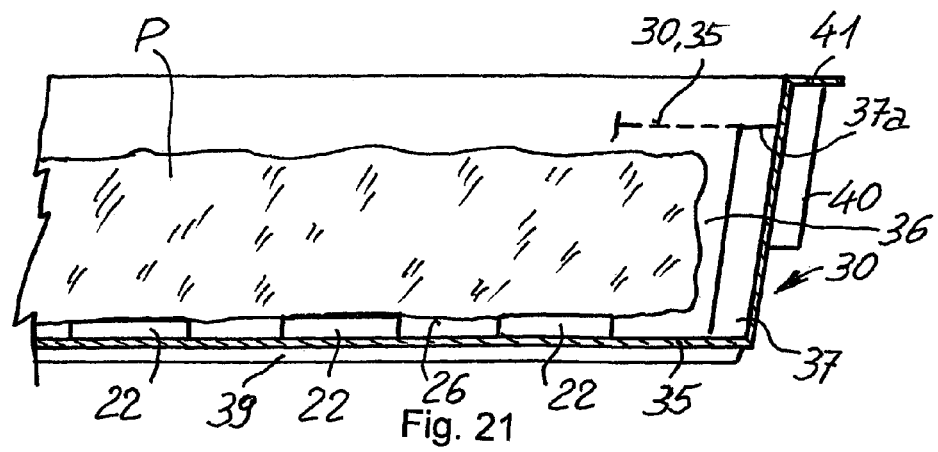
FIG. 21 shows, in enlarged scale, the detail in section according to the section line XXI-XXI in FIG. 20.
Figure 24:
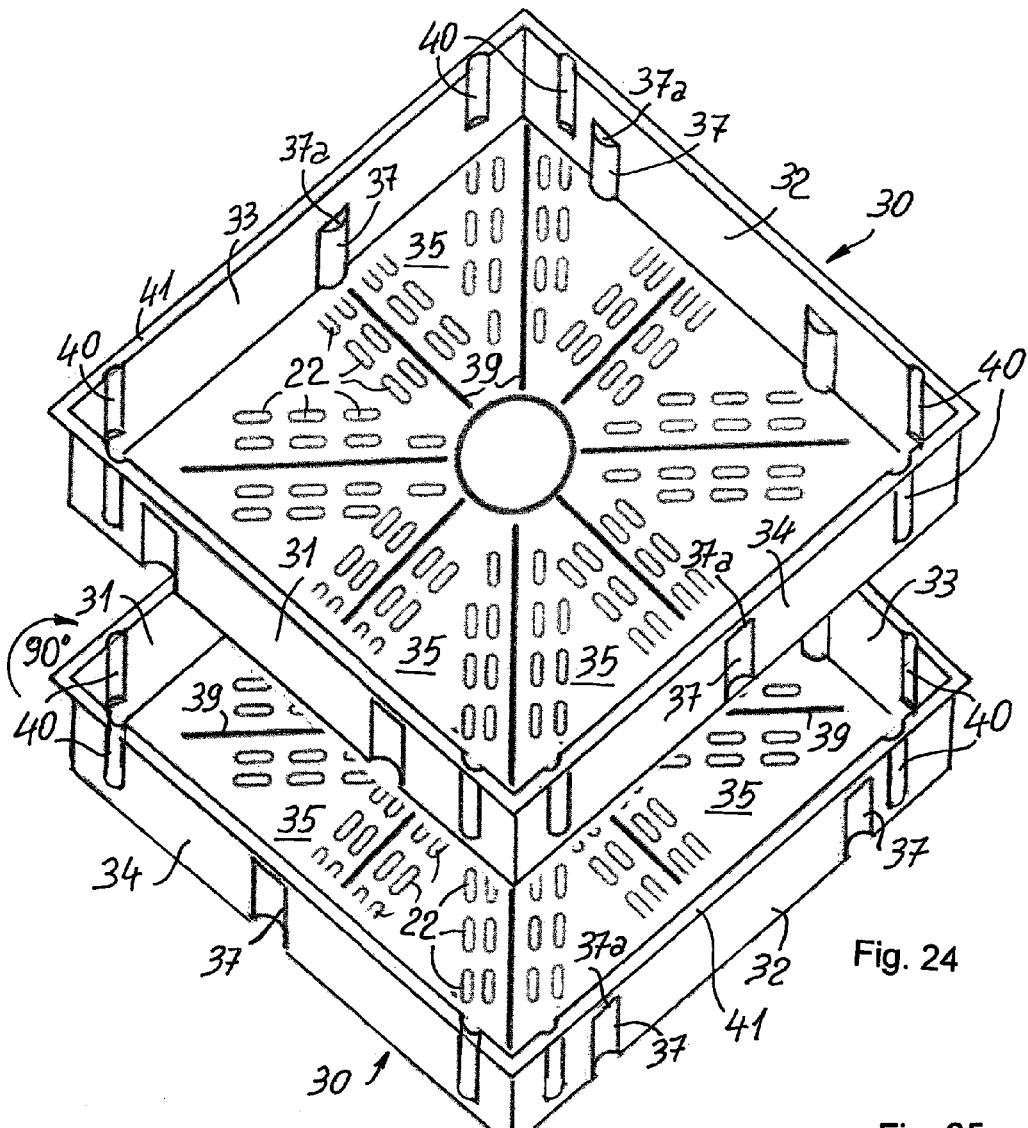
FIG. 24 is a top oblique perspective view on two pizza trays superimposed and spaced in the superimposition position thereof, before being sunk into each other.
Figure 25:
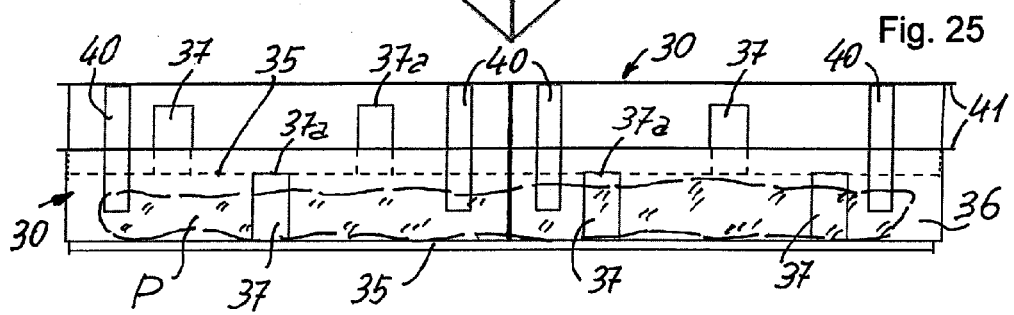
FIG. 25 is a front view on the two trays of FIG. 24 in the superimposed and embedded position thereof.

Now, reference shall be made to FIGS. 20 to 25 illustrating improved pizza dish-like or basin-like trays 30 made of synthetic material for handling food products according to the invention and forming pizza containers alternatively to the carton boxes. The basin-like trays 30 are polygonal-shaped, for example quadrangular-shaped, as illustrated in FIGS. 20, 22 and 24. The tray respectively has two first opposite walls 31 and 32 and two second opposite walls 33, 34, which are executed in a known manner slightly countersunk downwards, i.e. towards the bottom side 35, with the aim of allowing both the stacking of several trays (FIGS. 23 and 24), and a superimposition of the trays 30 (FIGS. 24 and 25) leaving between the bottoms 35 of two superimposed trays a chamber 36 for housing a pizza P.

The stacking of the trays occurs in that, as mentioned above, the trays 30 have the same perimeter configuration as the slightly bevelled walls. The spaced superimposition between the bottoms 35 of respectively two trays 30 is obtained by internally providing on the walls 31-34 stop abutments 37 projecting towards the internal of the tray 30 and obtained, in the illustrated example, similar to a substantially semi-cylindrical cavity extending from the horizontal support surface thereof 37a, which may be completely closed or partly open, up to the bottom 35 of the tray for a height H (FIG. 20) corresponding to the height of the chamber 36 for housing the pizza P. According to the teaching of the invention, such projections or stop abutments 37 are distributed in an opposite fashion and different from each other on the lateral walls 31, 32 and 33, 34.

Thus, maintaining the same arrangement of the stop projections 37 it is possible to either stack the trays 30 with the minimum overall dimension of the space (FIG. 23) or rotate, in the illustrated example, by 90 degrees, a tray 30 respectively lower with respect to a tray 30 respectively upper the containers are not stacked but the bottom 35 of an upper tray, after entry into the lower tray 30, shall rest on the stop projections 37a, serving as "primary chimneys" distributed on the four walls of the tanks 30, leaving between the two superimposed tanks the aforementioned chamber 36 for housing the pizza P. This obviously occurs for every tray progressively applied at the upper part in the desired/required stack of trays for the group of pizzas of a single customer. Placing the upper trays on said stop abutments 37a distributed on the four lateral walls 31-34 confers high stability to a stack of trays with relative pizzas therein, facilitating the handling of said stack of trays during the transport thereof and delivery to the customer.

In addition, in order to confer the trays the required rigidity, on the bottom 35 there are provided stiffening grooves 39, for example arranged radially, to facilitate further the cutting of the pizza into substantially triangular pieces, as often desired by customers, wherein said grooves 39 contribute to confer the required rigidity to the tray. As observable from the FIGS. 20, 21, 22 and 24, the bottom 35 of the trays 30 is also preferably provided with projections 22 arranged, for example, as illustrated in the pizza plate 20 and having the same function.

In order to facilitate the release of humidity and vapour released by the pizza on the walls 31-34 of the trays besides the "primary chimneys" 37 there are provided "secondary chimneys" 40, still in form of cavities, for example semi-cylindrical, projecting towards the external and terminating towards the external on the perimeter edge 41 of the trays 30, wherein the vapour rises upwards and also exits from all trays beneath the upper tray of a stack.

Besides the components illustrated and described above, the kit according to the invention is completed by covers 50 for closing the trays 30 singularly or the upper tray 30 in a stack of trays 30, wherein for the sake of simplicity and clarity said covers 50 can be simple or multiple similarly to the simple or multiple covers 11 and 11a and they are differentiated from the latter due to the fact that they do not have foldable fins 12, 12a. The covers 50 are quadrangular-shaped with surface slightly smaller than the opening of the trays and allowing the resting thereof on the stop abutments 37a, wherein the perimeter edge inside the lateral walls 31-34 shall determine the secure housing of the cover 50 in the tray 30, as observable from the detail indicated with a dashed line in FIG. 20, simultaneously representing the bottom 35 of a superimposed tray 30, while the perimeter edge 41 allows an easy handling of the trays.

The structural and functional description of the various components of the kit for take away pizzas according to the invention shows that the proposed task is efficiently solved and it is eco-friendly obtaining the aforementioned advantages.

Those skilled in the art may introduce modifications and variants to the components of the described kit according to their geometric shape, as well as according to the dimensions and arrangements of the protrusions, stiffening grooves, arrangement, number and geometric shape of the stop abutments, of the protrusions and so on and so forth, as well as regarding the choice of the materials, without departing from the scope of the present invention as described and claimed hereinafter.

The invention claimed is:

1. A kit for take-out pizza comprising:
   a pizza container; and
   a cover,
   wherein the pizza container comprises:
   a basin-shaped tray having slanted lateral sides that enable stacking a second tray thereon by supporting a bottom of the second tray received therein; and
   stop projections provided on lower inner portions of the lateral walls of the basin-shaped tray, the stop projections supporting the second tray to form a stack of trays to define, within the basin-shaped tray, a chamber for housing a pizza to be transported,
   wherein the stop projections are at least partially open to form chimneys that upwardly release vapor or condensate from the chamber to an outside even when the trays are stacked.

2. The kit according to claim 1, wherein different parallel pairs of the lateral walls have a different number and different positions of the stop projections.

3. The kit according to claim 1, wherein the cover is configured to be coupled to an inside of upper inner portions of the lateral walls.

4. The kit according to claim 3, wherein the cover has a shape corresponding to an inner perimeter of the tray at an upper end of the stop projections.

5. The kit according to claim 1, further comprising a plate adapted to be introduced in the container to support the pizza, the plate being made of a synthetic material suitable for handling food products and having spacers providing air circulation between a bottom of the pizza and an upper surface of the plate, the plate further having a gripping fin for a comfortable and correct removal of the plate with the pizza thereon without dirtying the container.

6. The kit according to claim 5, wherein there are four gripping fins configured to be folded upwards and arranged at corners of the plate, wherein the plate has a planar structure with edges for perimeter containment on three sides that extend upwards and a plurality of protrusions spaced from each other and projecting from the plate upwards, the plate further having radial grooves dividing the plate into substantially triangular sectors to facilitate a correct cutting of the pizza into substantially triangular segments.

7. The kit according to claim 1, further comprising:
a box protecting the pizza during housing and transport; and
a plate disposed within the box and having an appendage that facilitates removal of the pizza from the container,
wherein the cover operates as an advertisement medium and has a printable surface for information and advertisement.

8. The kit according to claim 7, wherein the box has an attached lid, the cover being configured to be coupled to the lid.

9. The kit according to claim 8,
wherein the cover carries an advertisement and is made as a single sheet cover having at least one lateral fin or is made in an accordion shape having a plurality of folded sheets having at least one fin on each lateral side, the at least one fin projecting and being foldable below the lid of the box,
wherein, after applying the cover, the lid closed on the box causes a firm positioning of the cover on the lid.

10. The kit according to claim 9, wherein the covers has a single fin for coupling to the lid, such that a side of the cover opposite to the fin is adapted to be coupled to the lid with a fixing element, the fixing element being a clip or adhesive tape.

11. The kit according to claim 8, further comprising a plate adapted to be introduced in the box to support the pizza, the plate being made of a synthetic material suitable for handling food products and having spacers providing air circulation between a bottom of the pizza and an upper surface of the plate, the plate further having a gripping fin for a comfortable and correct removal of the plate with the pizza thereon without dirtying the container.

12. The kit according to claim 11,
wherein the plate has a planar structure with edges for perimeter containment on three sides that extend upwards and a plurality of protrusions spaced from each other and projecting from the plate upwards, the plate further having radial grooves dividing the plate into substantially triangular sectors to facilitate a correct cutting of the pizza into substantially triangular segments,
wherein, the gripping fin is provided on a side of the plate facing an opening side of the lid for removably sliding the pizza from the box, and
wherein, at least on an edge of the plate opposite the gripping fin, there are provided two or more protrusions for holding the supported pizza.

13. The kit according to claim 1, further comprising stiffening members on the tray and spacers allowing air circulation below the pizza housed in the chamber.

14. A kit for take-out pizza comprising:
a pizza container; and
a cover,
wherein the pizza container comprises:
a basin-shaped tray having slanted lateral sides that enable stacking a second tray thereon by supporting a bottom of the second tray received therein;
stop projections provided on lower inner portions of the lateral walls of the basin-shaped tray, the stop projections supporting the second tray to form a stack of trays to define, within the basin-shaped tray, a chamber for housing a pizza to be transported, wherein the stop projections are at least partially open to form chimneys that upwardly release vapor or condensate from the chamber to an outside even when the trays are stacked; and
stiffening members on the tray and spacers allowing air circulation below the pizza housed in the chamber, wherein the stiffening members are structured as grooves projecting outwardly of the tray and arranged radially, and wherein the spacers providing the air circulation are a plurality of projections shaped as linear segments.

15. A kit for take-out pizza comprising:
a pizza container; and
a cover,
wherein the pizza container comprises:
a basin-shaped tray having slanted lateral sides that enable stacking a second tray thereon by supporting a bottom of the second tray received therein;
stop projections provided on lower inner portions of the lateral walls of the basin-shaped tray, the stop projections supporting the second tray to form a stack of trays to define, within the basin-shaped tray, a chamber for housing a pizza to be transported, wherein the stop projections are at least partially open to form chimneys that upwardly release vapor or condensate from the chamber to an outside even when the trays are stacked; and
chimney projections defined on the lateral walls that project outwardly of the lateral walls and are open at an upward end to release vapor or condensate from the chamber even when the trays are stacked, lower ends of the chimney projections being defined below upper ends of the stop projections.

\* \* \* \* \*